(12) United States Patent
Zhou et al.

(10) Patent No.: US 12,547,573 B2
(45) Date of Patent: Feb. 10, 2026

(54) AUTOMATIC REPAIR METHOD AND APPARATUS FOR DEVICE, AND ELECTRONIC DEVICE AND STORAGE MEDIUM

(71) Applicant: SUZHOU METABRAIN INTELLIGENT TECHNOLOGY CO., LTD., Jiangsu (CN)

(72) Inventors: Hanfang Zhou, Jiangsu (CN); Shanbin Ai, Jiangsu (CN); Daotong Li, Jiangsu (CN); Shuaishuai Jia, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/006,026

(22) Filed: Dec. 30, 2024

(65) Prior Publication Data
US 2025/0139044 A1 May 1, 2025

Related U.S. Application Data

(63) Continuation of application No. PCT/CN2023/122293, filed on Sep. 27, 2023.

(30) Foreign Application Priority Data

Jan. 9, 2023 (CN) .......................... 202310028696.8

(51) Int. Cl.
*G06F 13/42* (2006.01)
*G06F 13/40* (2006.01)

(52) U.S. Cl.
CPC ...... *G06F 13/4068* (2013.01); *G06F 13/4221* (2013.01); *G06F 2213/0026* (2013.01)

(58) Field of Classification Search
CPC ............ G06F 13/4068; G06F 13/4221; G06F 2213/0026
See application file for complete search history.

(56) References Cited

U.S. PATENT DOCUMENTS

| 11,226,919 B1 * | 1/2022 | Austin ................. G06F 9/4401 |
| 2008/0263246 A1 * | 10/2008 | Larson ................. G06F 13/372 |
| | | 710/107 |

(Continued)

FOREIGN PATENT DOCUMENTS

| CN | 106681878 A | 5/2017 |
| CN | 106789409 A | 5/2017 |

(Continued)

*Primary Examiner* — Henry Tsai
*Assistant Examiner* — Kim T Huynh
(74) *Attorney, Agent, or Firm* — IPro, PLLC

(57) ABSTRACT

The present disclosure discloses a method for automatically repairing a device, an electronic device and a storage medium. The method includes: obtaining first link state information and first link performance information of a port corresponding to a peripheral component interconnect express (PCIe) device; if a first transmission rate in the first link state information is inconsistent with a second transmission rate in the first link performance information, determining that the port corresponding to the PCIe device is a first abnormal port; if first bandwidth information in the first link state information is less than a preset bandwidth threshold corresponding to second bandwidth information in the first link performance information, determining that the port corresponding to the PCIe device is the first abnormal port; performing a link restart on a link disable bit in a link control register of the first abnormal port to complete a repair of the PCIe device.

15 Claims, 5 Drawing Sheets

(56) References Cited

U.S. PATENT DOCUMENTS

| | | | | |
|---|---|---|---|---|
| 2017/0228330 A1* | 8/2017 | Huang | ................ | G06F 13/4081 |
| 2021/0342280 A1* | 11/2021 | McDaniel | ................ | G06F 13/20 |
| 2024/0264896 A1* | 8/2024 | Shenbagam | ........ | G06F 11/0769 |
| 2025/0094049 A1* | 3/2025 | Qin | ....................... | H04L 5/1438 |

FOREIGN PATENT DOCUMENTS

| | | |
|---|---|---|
| CN | 108664361 A | 10/2018 |
| CN | 111209146 A | 5/2020 |
| CN | 111488233 A | 8/2020 |
| CN | 111988196 A | 11/2020 |
| CN | 113590511 A | 11/2021 |
| CN | 113688087 A | 11/2021 |
| CN | 115033441 A | 9/2022 |
| CN | 115576730 A | 1/2023 |
| CN | 115756941 A | 3/2023 |
| WO | 2013095422 A1 | 6/2013 |

* cited by examiner

101 — First link state information and first link performance information of a port corresponding to a peripheral component interconnect express (PCIe) device are obtained, where the first link state information at least includes a first transmission rate and first bandwidth information of the port corresponding to the PCIe device, and the first link performance information at least includes a second transmission rate and second bandwidth information of a link where the port corresponding to the PCIe device is located 102 — In response to the first transmission rate being inconsistent with the second transmission rate, it is determined that the port corresponding to the PCIe device is a first abnormal port 103 — In response to the first bandwidth information being less than a preset bandwidth threshold corresponding to the second bandwidth information, it is determined that the port corresponding to the PCIe device is the first abnormal port 104 — Link restart is performed on a link disable bit in a link control register of the first abnormal port to complete a repair of the PCIe device

FIG. 1

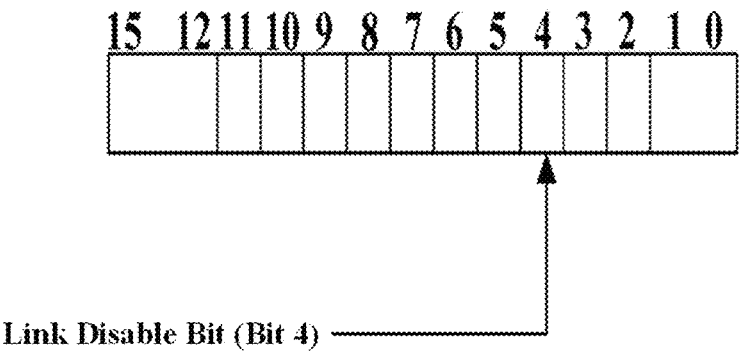

FIG. 2

| Link state information and link performance information of a port corresponding to a peripheral component interconnect express (PCIe) device are obtained, where the link state information at least includes a first transmission rate and first bandwidth information of the port corresponding to the PCIe device, and the link performance information at least includes a second transmission rate and second bandwidth information of a link where the port corresponding to the PCIe device is located | S301 |
|---|---|
| It is determined whether the first transmission rate is consistent with the second transmission rate, and if the first transmission rate is consistent with the second transmission rate, a repair strategy is not performed; and if the first transmission rate is inconsistent with the second transmission rate, the repair strategy is performed | S302 |
| It is determined whether the first bandwidth information is less than a lowest bandwidth of uplink and downlink ports corresponding to the second bandwidth information, if the first bandwidth information is less than the lowest bandwidth, the repair strategy is performed; and if the first bandwidth information is not less than (that is, equal to) the lowest bandwidth, the repair strategy is performed | S303 |
| After performing the repair strategy, if the repair is still unsuccessful, the repair strategy is performed again | S304 |
| If the repair is successful by performing the repair strategy less than or equal to three times, a base input/output system is continued to start | S305 |
| If the repair is still unsuccessful by performing the repair strategy more than three times, the base input/output system is restarted | S306 |

FIG. 3

AUTOMATIC REPAIR METHOD AND APPARATUS FOR DEVICE, AND ELECTRONIC DEVICE AND STORAGE MEDIUM

CROSS-REFERENCE TO RELATED APPLICATION

The present disclosure claims the priority of Chinese patent application filed on Jan. 9, 2023 before the CNIPA, China National Intellectual Property Administration with the application number of 202310028696.8, and the title of "METHOD AND APPARATUS FOR AUTOMATICALLY REPAIRING DEVICE, ELECTRONIC DEVICE AND STORAGE MEDIUM", which is incorporated herein in its entirety by reference.

FIELD

The present disclosure relates to the field of information processing technologies, and more particularly to a method for automatically repairing a device, an apparatus for automatically repairing a device, an electronic device and a computer readable storage medium.

BACKGROUND

With the continuous development of Internet technologies, people have increasing demands for basic input/output system (BIOS) adaptation devices. When allocating resources, resource allocators often need to consider actual needs of different customers and actual situations of devices, which easily leads to abnormal resource allocation problems in many projects. In addition, with the increasing demands of the customers, it is easy to repeatedly encounter the same problems, which greatly increases labor costs and time consumption of the resource allocation.

At present, when allocating or updating the resources for the devices, in order to ensure the operating stability of the devices, when it is detected that a degradation repair needs to be performed on the devices, the degradation repair is usually realized by performing hot update on contents or functions using loaded resource packages. However, if this method is used to repair, an adaptive range of repairable devices is relatively small and it is impossible to repair devices at an end of a device link. At the same time, it is unstable to rely on the loaded resource packages to realize the repair, and for the resource reservation of the devices, it is also prone to problems such as device identification errors and inaccurate reserved resources.

SUMMARY

Embodiments of the present disclosure provides a method and an apparatus for automatically repairing a device, an electronic device and a computer readable storage medium, so as to solve or partially solve problems that in existing methods for repairing devices, an adaptive range of repairable devices is relatively small, and reserved resources are not accurate due to device identification error.

The embodiments of the present disclosure disclose a method for automatically repairing a device, including:
obtaining first link state information and first link performance information of a port corresponding to a peripheral component interconnect express (PCIe) device, where the first link state information at least includes a first transmission rate and first bandwidth information of the port corresponding to the PCIe device, and the first link performance information at least includes a second transmission rate and second bandwidth information of a link where the port corresponding to the PCIe device is located;
in response to the first transmission rate being inconsistent with the second transmission rate, determining that the port corresponding to the PCIe device is a first abnormal port;
in response to the first bandwidth information being less than a preset bandwidth threshold corresponding to the second bandwidth information, determining that the port corresponding to the PCIe device is the first abnormal port; and
performing a link restart on a link disable bit in a link control register of the first abnormal port to complete a repair of the PCIe device.

In some embodiments of the present disclosure, performing the link restart on the link disable bit in the link control register of the first abnormal port includes:
setting the link disable bit in the link control register of the first abnormal port to 1, then setting the link disable bit to 0, and performing the link restart on the first abnormal port.

In some embodiments of the present disclosure, setting the link disable bit in the link control register of the first abnormal port to 1, then setting the link disable bit to 0, and performing the link restart on the first abnormal port includes:
setting the link disable bit in the link control register of the first abnormal port to 1, then setting the link disable bit to 0 after a preset delay duration, and performing the link restart on the first abnormal port.

In some embodiments of the present disclosure, in response to the first bandwidth information being less than the preset bandwidth threshold corresponding to the second bandwidth information, determining that the port corresponding to the PCIe device is the first abnormal port includes:
in response to the first bandwidth information being less than a lowest bandwidth of uplink and downlink ports corresponding to the second bandwidth information, determining that a bandwidth corresponding to the first link state information is inconsistent with a bandwidth corresponding to the first link performance information, and determining the port corresponding to the PCIe device as the first abnormal port.

In some embodiments of the present disclosure, the method further includes:
in response to the first bandwidth information being equal to the preset bandwidth threshold corresponding to the second bandwidth information, determining that an operating state of the PCIe device is normal without performing a repair on the port corresponding to the PCIe device.

In some embodiments of the present disclosure, in response to the first bandwidth information being equal to the preset bandwidth threshold corresponding to the second bandwidth information, determining that the operating state of the PCIe device is normal includes:
in response to the first bandwidth information being equal to the lowest bandwidth of uplink and downlink ports corresponding to the second bandwidth information, determining that the bandwidth corresponding to the first link state information is consistent with the bandwidth corresponding to the first link performance information, and determining that the operating state of the PCIe device is normal.

In some embodiments of the present disclosure, after performing the link restart on the link disable bit in the link control register of the first abnormal port, the method further includes:

in response to the first transmission rate being still inconsistent with the second transmission rate after performing the link restart, or in response to the first bandwidth information being still less than the preset bandwidth threshold corresponding to the second bandwidth information after performing the link restart, performing the link restart on the link disable bit in the link control register of the first abnormal port again.

In some embodiments of the present disclosure, performing the link restart on the link disable bit in the link control register of the first abnormal port again includes:

setting the link disable bit in the link control register of the first abnormal port to 1 again, and then setting the link disable bit to 0 after a preset delay duration to complete a second link restart of the first abnormal port.

In some embodiments of the present disclosure, after performing the link restart on the link disable bit in the link control register of the first abnormal port again, the method further includes:

in response to the first transmission rate being still inconsistent with the second transmission rate after performing a preset quantity of times of link restarts, performing a restart operation on a base input/output system.

In some embodiments of the present disclosure, after performing the link restart on the link disable bit in the link control register of the first abnormal port again, the method further includes:

in response to the first bandwidth information being still less than the preset bandwidth threshold corresponding to the second bandwidth information after performing a preset quantity of times of link restarts, performing a restart operation on a base input/output system.

In some embodiments of the present disclosure, the method further includes:

in response to a quantity of restart times of the link restart being less than or equal to a preset quantity of times and the first transmission rate being consistent with the second transmission rate after performing the quantity of restart times of link restarts, continuing to start a base input/output system.

In some embodiments of the present disclosure, the method further includes:

in response to a quantity of restart times of the link restart being less than or equal to a preset quantity of times and the first bandwidth information being equal to the preset bandwidth threshold corresponding to the second bandwidth information after performing the quantity of restart times of link restarts, continuing to start a base input/output system.

In some embodiments of the present disclosure, the method further includes:

in response to the first transmission rate being consistent with the second transmission rate, determining that an operating state of the PCIe device is normal without performing a repair on the port corresponding to the PCIe device.

In some embodiments of the present disclosure, the method further includes:

in response to detecting that a communication connection is established with an external memory card, obtaining second link state information and second link performance information of a port corresponding to the external memory card, where the second link state information at least includes a third transmission rate of the port corresponding to the external memory card, and the second link performance information at least includes a fourth transmission rate of a link where the port corresponding to the external memory card is located;

in response to the third transmission rate being inconsistent with the fourth transmission rate and the third transmission rate being less than a preset transmission rate, determining that the port corresponding to the external memory card is a second abnormal port; and performing a link restart on a link disable bit in a link control register of the second abnormal port to complete a repair of the external memory card.

In some embodiments of the present disclosure, the method further includes:

in response to the third transmission rate being consistent with the fourth transmission rate, determining that an operating state of the external memory card is normal without performing a repair on the port corresponding to the external memory card.

In some embodiments of the present disclosure, after performing the link restart on the link disable bit in the link control register of the second abnormal port, the method further includes:

in response to the third transmission rate being still inconsistent with the fourth transmission rate after performing the link restart, performing the link restart on the link disable bit in the link control register of the second abnormal port again.

In some embodiments of the present disclosure, performing the link restart on the link disable bit in the link control register of the second abnormal port again includes:

setting the link disable bit in the link control register of the second abnormal port to 1 again, and then setting the link disable bit to 0 after a preset delay duration to complete a second link restart of the second abnormal port.

The embodiments of the present disclosure further disclose an apparatus for automatically repairing a device, including:

a device link information obtaining module configured to obtain first link state information and first link performance information of a port corresponding to a peripheral component interconnect express (PCIe) device, where the first link state information at least includes a first transmission rate and first bandwidth information of the port corresponding to the PCIe device, and the first link performance information at least includes a second transmission rate and second bandwidth information of a link where the port corresponding to the PCIe device is located;

a first transmission rate comparison module configured to in response to the first transmission rate being inconsistent with the second transmission rate, determine that the port corresponding to the PCIe device is a first abnormal port;

a first bandwidth information comparison module configured to in response to the first bandwidth information being less than a preset bandwidth threshold corresponding to the second bandwidth information, determine that the port corresponding to the PCIe device is the first abnormal port; and a device link restart module configured to perform a link restart on a link disable bit in a link control register of the first abnormal port to complete a repair of the PCIe device.

In some embodiments of the present disclosure, the device link restart module is configured to:

set the link disable bit in the link control register of the first abnormal port to 1, then set the link disable bit to 0, and perform the link restart on the first abnormal port.

In some embodiments of the present disclosure, the device link restart module is configured to:

set the link disable bit in the link control register of the first abnormal port to 1, then set the link disable bit to 0 after a preset delay duration, and perform the link restart on the first abnormal port.

In some embodiments of the present disclosure, the first bandwidth information comparison module is configured to:

in response to the first bandwidth information being less than a lowest bandwidth of uplink and downlink ports corresponding to the second bandwidth information, determine that a bandwidth corresponding to the first link state information is inconsistent with a bandwidth corresponding to the first link performance information, and determine the port corresponding to the PCIe device as the first abnormal port.

In some embodiments of the present disclosure, the apparatus further includes:

a first bandwidth information comparison submodule configured to in response to the first bandwidth information being equal to the preset bandwidth threshold corresponding to the second bandwidth information, determine that an operating state of the PCIe device is normal without performing a repair on the port corresponding to the PCIe device.

In some embodiments of the present disclosure, the first bandwidth information comparison submodule is configured to:

in response to the first bandwidth information being equal to the lowest bandwidth of uplink and downlink ports corresponding to the second bandwidth information, determine that the bandwidth corresponding to the first link state information is consistent with the bandwidth corresponding to the first link performance information, and determine that the operating state of the PCIe device is normal.

In some embodiments of the present disclosure, the apparatus further includes:

a device link secondary restart module configured to in response to the first transmission rate being still inconsistent with the second transmission rate after performing the link restart, or in response to the first bandwidth information being still less than the preset bandwidth threshold corresponding to the second bandwidth information after performing the link restart, perform the link restart on the link disable bit in the link control register of the first abnormal port again.

In some embodiments of the present disclosure, the device link secondary restart module is configured to:

set the link disable bit in the link control register of the first abnormal port to 1 again, and then set the link disable bit to 0 after a preset delay duration to complete a second link restart of the first abnormal port.

In some embodiments of the present disclosure, the apparatus further includes:

a base input/output system restart module configured to in response to the first transmission rate being still inconsistent with the second transmission rate after performing a preset quantity of times of link restarts, perform a restart operation on a base input/output system.

In some embodiments of the present disclosure, the apparatus further includes:

a base input/output system restart submodule configured to in response to the first bandwidth information being still less than the preset bandwidth threshold corresponding to the second bandwidth information after performing a preset quantity of times of link restarts, perform a restart operation on a base input/output system.

In some embodiments of the present disclosure, the apparatus further includes:

a base input/output system start module configured to in response to a quantity of restart times of the link restart being less than or equal to a preset quantity of times and the first transmission rate being consistent with the second transmission rate after performing the quantity of restart times of link restarts, continue to start a base input/output system.

In some embodiments of the present disclosure, the apparatus further includes:

a base input/output system start submodule configured to in response to a quantity of restart times of the link restart being less than or equal to a preset quantity of times and the first bandwidth information being equal to the preset bandwidth threshold corresponding to the second bandwidth information after performing the quantity of restart times of link restarts, continue to start a base input/output system.

In some embodiments of the present disclosure, the apparatus further includes:

a first transmission rate comparison submodule configured to in response to the first transmission rate being consistent with the second transmission rate, determine that an operating state of the PCIe device is normal without performing a repair on the port corresponding to the PCIe device.

In some embodiments of the present disclosure, the apparatus further includes:

an external memory card link information obtaining module configured to in response to detecting that a communication connection is established with an external memory card, obtain second link state information and second link performance information of a port corresponding to the external memory card, where the second link state information at least includes a third transmission rate of the port corresponding to the external memory card, and the second link performance information at least includes a fourth transmission rate of a link where the port corresponding to the external memory card is located;

a third transmission rate comparison module configured to in response to the third transmission rate being inconsistent with the fourth transmission rate and the third transmission rate being less than a preset transmission rate, determine that the port corresponding to the external memory card is a second abnormal port; and an external memory card link restart module configured to perform a link restart on a link disable bit in a link control register of the second abnormal port to complete a repair of the external memory card.

In some embodiments of the present disclosure, the apparatus further includes:

a third transmission rate comparison submodule configured to in response to the third transmission rate being consistent with the fourth transmission rate, determine that an operating state of the external memory card is normal without performing a repair on the port corresponding to the external memory card.

In some embodiments of the present disclosure, the apparatus further includes:

an external memory card link secondary restart module configured to in response to the third transmission rate being still inconsistent with the fourth transmission rate after performing the link restart, perform the link restart on the link disable bit in the link control register of the second abnormal port again.

In some embodiments of the present disclosure, the external memory card link secondary restart module is configured to:

set the link disable bit in the link control register of the second abnormal port to 1 again, and then set the link disable bit to 0 after a preset delay duration to complete a second link restart of the second abnormal port.

The embodiments of the present disclosure further disclose an electronic device, including a processor, a communication interface, a memory and a communication bus, where the processor, the communication interface and the memory communicate with each other via the communication bus;

the memory is configured to store a computer program; and the processor is configured to implement the method according to the embodiments of the present disclosure when executing the computer program stored on the memory.

The embodiments of the present disclosure further disclose a non-transitory computer readable storage medium having stored thereon instructions which, when executed by one or more processors, cause the processors to perform the method according to the embodiments of the present disclosure.

The embodiments of the present disclosure include the following advantages.

In embodiments of the present disclosure, there is provided a method for automatically repairing a device. By obtaining link state information and link performance information of a port corresponding to a peripheral component interconnect express (PCIe) device; in response to a transmission rate in the link state information being inconsistent with a transmission rate in the link performance information, or in response to bandwidth information in the link state information being less than a preset bandwidth threshold corresponding to bandwidth information in the link performance information, determining that the port corresponding to the PCIe device is an abnormal port; and performing a link restart on a link disable bit in a link control register of the abnormal port to complete an automatic determination and repair of the PCIe device, the processing and repairing efficiency after reducing the rate and/or the bandwidth of the device is greatly improved, labor costs and repair costs are reduced, the accuracy of the resource reservation of the device is improved, and the strength of repairing the base input/output system is also increased.

BRIEF DESCRIPTION OF THE DRAWINGS

FIG. 1 is a flowchart of steps of a method for automatically repairing a device provided in an embodiment of the present disclosure.

FIG. 2 is a schematic diagram of a link disable bit in a link control register provided in an embodiment of the present disclosure.

FIG. 3 is a flowchart of a method for automatically repairing a device provided in an embodiment of the present disclosure.

DETAILED DESCRIPTION

Figure 4:
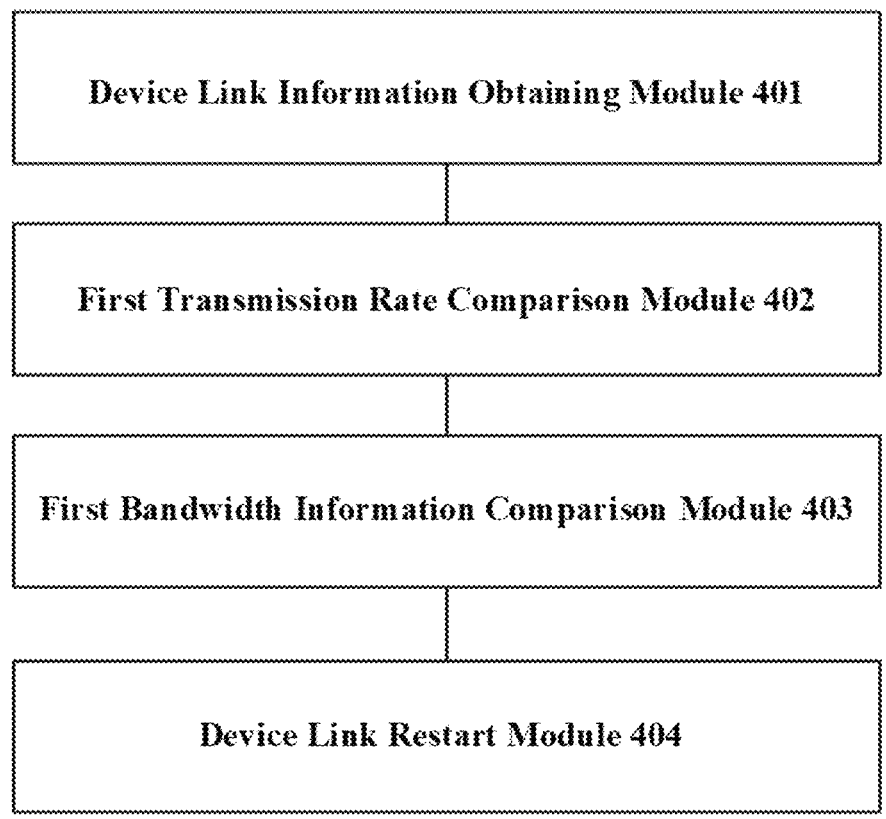
FIG. 4 is a structural block diagram of an apparatus for automatically repairing a device provided in an embodiment of the present disclosure.

In order to make the objectives, features, and advantages of the present disclosure more obvious and easy to understand, the present disclosure will be described in further detail below with reference to the accompanying drawings and embodiments.

As an example, with the continuous development of Internet technologies, people have increasing demands for basic input/output system (BIOS) adaptation devices. When allocating resources, resource allocators often need to consider actual needs of different customers and actual situations of devices, which easily leads to abnormal resource allocation problems in many projects. In addition, with the increasing demands of the customers, it is easy to repeatedly encounter the same problems, which greatly increases labor costs and time consumption of the resource allocation.

At present, when allocating or updating the resources for the devices, in order to ensure the operating stability of the devices, when it is detected that a degradation repair needs to be performed on the devices, the degradation repair is usually realized by performing hot update on contents or functions using loaded resource packages. However, if this method is used to repair, an adaptive range of repairable devices is relatively small and it is impossible to repair devices at an end of a device link. At the same time, it is unstable to rely on the loaded resource packages to realize the repair, and for the resource reservation of the devices, it is also prone to problems such as device identification errors and inaccurate reserved resources.

Taking a server as an example, in a process of using the server, a bandwidth and a rate of peripheral component interconnect express (PCIe) devices are two parameters that have attracted more attention. The bandwidth and the rate have a relatively large impact on the performance of the PCIe devices. The bandwidth of the PCIe devices refers to a number of local area network (LAN) emulation (Lane) for data transmission. Generally, the bandwidth includes several types such as ×1, ×2, ×4, ×8 and ×16. The rate of the PCIe devices refers to a rate of each Lane, expressed in terms of Gen (a speed at which PCIe hardware links transmit bit streams) or Gb/s (Gigabyte/second), for example, Gen1 (2.5 Gb/s), Gen2 (5 Gb/s), Gen3 (8 Gb/s), Gen4 (16 Gb/s). On some service platforms, a maximum rate of Gen4 can be supported. It can be seen that if the bandwidth or rate of a PCIe device is abnormal, the function of the PCIe device will be affected, and may even result in ineffective use.

One of core invention points of the embodiments of the present disclosure is to provide a method for automatically repairing a device. By obtaining link state information and link performance information of a port corresponding to a peripheral component interconnect express (PCIe) device; in response to a transmission rate in the link state information being inconsistent with a transmission rate in the link performance information, or in response to bandwidth information in the link state information being less than a preset bandwidth threshold corresponding to bandwidth information in the link performance information, determining that the port corresponding to the PCIe device is an abnormal port; and performing a link restart on a link disable bit in a link control register of the abnormal port to complete an automatic determination and repair of the PCIe device, the processing and repairing efficiency after reducing the rate and/or the bandwidth of the device is greatly improved, labor costs and repair costs are reduced, the accuracy of the resource reservation of the device is improved, and the strength of repairing the base input/output system is also increased.

Figure 7:
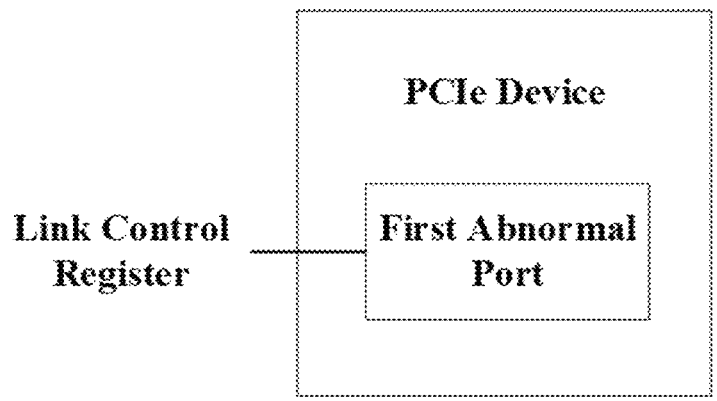
FIG. 7 is a structural block diagram of a peripheral component interconnect express (PCIe) device provided in an embodiment of the present disclosure.

Referring to FIG. 1 and FIG. 7, FIG. 1 is a flowchart of steps of a method for automatically repairing a device provided in an embodiment of the present disclosure; and FIG. 7 is a structural block diagram of a peripheral component interconnect express (PCIe) device provided in an embodiment of the present disclosure. The method can include the following steps.

Step 101, first link state information and first link performance information of a port corresponding to a peripheral component interconnect express (PCIe) device are obtained, where the first link state information at least includes a first transmission rate and first bandwidth information of the port corresponding to the PCIe device, and the first link performance information at least includes a second transmission rate and second bandwidth information of a link where the port corresponding to the PCIe device is located.

Taking server architecture as an example, a link state (LinkSta) refers to a description of a relationship between an interface (that is, a port) with network devices adjacent to the interface, and information of the interface is information of a link, that is, a state (information) of the link. The link state information can include information such as an internet protocol version 6 (IPv6) prefix of the interface, a subnet mask, a network (link) type connected to the interface and a router on the same network (link) with the interface. The link state information can also include state parameters, for example, a bandwidth, a delay and a transmission rate. A link performance (Linkcap) refers to a quantitative description of function characteristics of a link, mainly including a degree of function realization, a durability of function maintenance, a scope of function application, implementation conditions of function, and the like. Link performance information can be expressed as the inevitable expression or reflection of the function characteristics of the link under specified technical indicators and related constraints, for example, the bandwidth or the transmission rate corresponding to the link, and the like. In the present disclosure, the bandwidth and the rate of the PCIe devices are mainly used as repair determination standards, and thus in the embodiment of the present disclosure, only the bandwidth information and the transmission rate in the link state information, as well as the bandwidth information and the transmission rate in the link performance information are used as determination standards for rate reduction/bandwidth reduction.

In one embodiment, the first link state information and the first link performance information of the port corresponding to the PCIe device can be obtained. The first link state information at least includes the first transmission rate and first bandwidth information of the port corresponding to the PCIe device, and the first link performance information at least includes the second transmission rate and second bandwidth information of the link where the port corresponding to the PCIe device is located. By obtaining the link state information and the link performance information corresponding to the PCIe devices, the obtained information may be used as determination standards of the degradation repair in subsequent repair processes of the devices.

Step 102, in response to the first transmission rate being inconsistent with the second transmission rate, it is determined that the port corresponding to the PCIe device is a first abnormal port.

The first transmission rate and the second transmission rate can be compared to determine whether the first transmission rate and the second transmission rate are consistent. When the first transmission rate is inconsistent with the second transmission rate, for example, the first transmission rate is Gen2 (5 Gb/s) and the second transmission rate is Gen3 (8 Gb/s), it can be determined that a repair strategy needs to be performed on the port corresponding to the PCIe device, and the port corresponding to the PCIe device can be determined as the first abnormal port, so as to realize the automatic repair of the abnormal port.

In another situation, if the first transmission rate is consistent with the second transmission rate, for example, both the first transmission rate and the second transmission rate are Gen3 (8 Gb/s), it can be determined that an operating state of the PCIe device is normal, and it is unnecessary to perform a repair on the port corresponding to the PCIe device, that is, the device can be correctly identified. By comparing the transmission rate in the link state information and the transmission rate in the link performance information, the transmission rate may be used as the determination standard for the rate reduction to realize the automatic determination of the PCIe device, when the transmission rate in the link state information and the transmission rate in the link performance information are inconsistent, the automatic repair of the PCIe device may be realized; and when the transmission rate in the link state information and the transmission rate in the link performance information are consistent, it is automatically determined that the PCIe device does not need to be repaired, and thus the determination process and the repair process may be automatically realized without manual investigation, the repair process is simplified, and the repair efficiency is improved.

Step 103, in response to the first bandwidth information being less than a preset bandwidth threshold corresponding to the second bandwidth information, it is determined that the port corresponding to the PCIe device is the first abnormal port.

At the same time, for the determination and repair of the bandwidth reduction, a comparison result between the bandwidth of link state and the bandwidth of link performance may be used as the determination standard for the bandwidth reduction. In one embodiment, if the first bandwidth information is less than a preset bandwidth threshold corresponding to the second bandwidth information, it is determined that the port corresponding to the PCIe device is the first abnormal port, so as to realize the automatic repair of the abnormal port.

As an embodiment, a lowest bandwidth of uplink and downlink ports corresponding to the second bandwidth information in the link performance information may be used as the basis for determining the bandwidth reduction. If the first bandwidth information is less than the preset bandwidth threshold corresponding to the second bandwidth information, determining that the port corresponding to the PCIe device is the first abnormal port includes: if the first bandwidth information is less than the lowest bandwidth of the uplink and downlink ports corresponding to the second bandwidth information, determining that a bandwidth corresponding to the first link state information is inconsistent with a bandwidth corresponding to the first link performance information, and determining the port corresponding to the PCIe device as the first abnormal port. For example, the bandwidth corresponding to the first bandwidth information is ×2, and the lowest bandwidth of the uplink and downlink ports corresponding to the second bandwidth information is ×4, at this time, it can be determined that the repair strategy needs to be performed on the port corresponding to the PCIe device, and the port corresponding to the PCIe device can be determined as the first abnormal port, so that the abnormal port can be automatically repaired.

In another situation, if the first bandwidth information is equal to the preset bandwidth threshold corresponding to the second bandwidth information, it is determined that the operating state of the PCIe device is normal, and it is unnecessary to repair the port corresponding to the PCIe device. Further, if the first bandwidth information is equal to the preset bandwidth threshold corresponding to the second bandwidth information, determining that the operating state of the PCIe device is normal includes: if the first bandwidth information is equal to the lowest bandwidth of the uplink and downlink ports corresponding to the second bandwidth information, for example, the bandwidth corresponding to the first bandwidth information is ×4, and the lowest bandwidth of the uplink and downlink ports corresponding to the second bandwidth information is also ×4, that is, the bandwidth corresponding to the first link state information is consistent with the bandwidth corresponding to the first link performance information, and it is determined that the operating state of the PCIe device is normal, and it is unnecessary to perform a repair on the port corresponding to the PCIe device.

By comparing the bandwidth information in the link state information and the bandwidth information in the link performance information, the bandwidth may be used as the determination standard for the bandwidth reduction to realize the automatic determination of the PCIe device, when the bandwidth information in the link state information and the bandwidth information in the link performance information are inconsistent, the PCIe device may be automatically repaired, and when the bandwidth information in the link state information and the bandwidth information in the link performance information are consistent, it is automatically determined that the PCIe device does not need to be repaired, and thus the determination process and the repair process may be automatically realized without manual investigation, the repair process is simplified, and the repair efficiency is improved.

Step 104, a link restart is performed on a link disable bit in a link control register of the first abnormal port to complete a repair of the PCIe device.

When it is determined that the repair strategy needs to be performed on the PCIe device and the first abnormal port is determined, the repair of the PCIe device may be completed by performing the link restart on the link disable bit in the link control register of the first abnormal port, thereby realizing automatic determination and repair of the PCIe device.

For example, referring to FIG. 2, FIG. 2 is a schematic diagram of a link disable bit in a link control register provided in an embodiment of the present disclosure. There are 16 bits in the link control register, ranging from 0 to 15, and a fourth bit (Bit 4) is the link disable bit needed in the embodiment of the present disclosure. It should be pointed out that other bit numbers except for the fourth bit are not involved in the embodiment of the present disclosure, and thus they are not marked in the drawings. It can be understood that the link control register does not only include the link disable bit, and the present disclosure does not limit this.

Referring to FIG. 2, performing the link restart on the link disable bit in the link control register of the first abnormal port can include: setting the link disable bit in the link control register of the first abnormal port to 1, then setting the link disable bit to 0, and performing the link restart on the first abnormal port. By disabling the port (Disable Port) and then enabling the port (Enable Port) in the link control register, the link may be restarted.

Further, for the process of performing the link restart on the port, in order to ensure a better repair effect, the link disable bit can be set to 1, then set to 0 after waiting a short time (for example, 100 ms) is delayed, and after a delay of 100 ms, it is determined whether the link restart operation is successful by comparing the transmission rate or the bandwidth again, so as to determine whether the device has been automatically repaired. In one embodiment, setting the link disable bit in the link control register of the first abnormal port to 1, then setting the link disable bit to 0, and performing the link restart on the first abnormal port can include: setting the link disable bit in the link control register of the first abnormal port to 1, then setting the link disable bit to 0 after a preset delay duration, and performing the link restart on the first abnormal port. By performing the link restart operation on the link disable bit in the link control register, the automatic repair of the PCIe device may be realized.

As an embodiment, there may be situations where the PCIe device cannot be successfully repaired after performing the link restart operation, and then the link restart operation can be performed on the link disable bit in the link control register again to realize a secondary repair for the PCIe device. In one embodiment, after performing the link restart on the link disable bit in the link control register of the first abnormal port, if the first transmission rate is still inconsistent with the second transmission rate after performing the link restart, or if the first bandwidth information is still less than the preset bandwidth threshold corresponding to the second bandwidth information after performing the link restart, the link restart is performed on the link disable bit in the link control register of the first abnormal port again.

Further, performing the link restart on the link disable bit in the link control register of the first abnormal port again can include: setting the link disable bit in the link control register of the first abnormal port to 1 again, and then setting the link disable bit to 0 after a preset delay duration to complete a second link restart of the first abnormal port. By performing the link restart operation on the link disable bit in the link control register again, secondary automatic repair for PCIe devices may be achieved.

As an embodiment, for the determination process of the rate reduction, there may be situations where the PCIe device cannot be repaired after being restarted several times, at this time, if the link restart operation is continuously performed, the PCIe device may not be repaired, and a restart operation can be performed on a base input/output system to directly restart the link of the whole server. After performing the link restart on the link disable bit in the link control register of the first abnormal port again, if the first transmission rate is still inconsistent with the second transmission rate after performing a preset quantity of times of link restarts, the restart operation is performed on the base input/output system. As an example, assuming that the first transmission rate and the second transmission rate are still inconsistent after performing the link restart for three times, the restart operation is performed on the base input/output system. By performing the restart operation on the base input/output system, the whole link is restarted, thereby realizing the automatic repair of the PCIe device. It should be pointed out that setting the preset quantity of times to three times is only an illustrative explanation, and a person skilled in the art can set the preset quantity of times of link restarts according to actual situations, and the present disclosure does not limit this.

As an embodiment, for the determination process of the bandwidth reduction, there may be situations where the PCIe device cannot be repaired after being restarted several times, at this time, if the link restart operation is continuously performed, the PCIe device may not be repaired, and a restart operation can be performed on a base input/output system to directly restart the link of the whole server. After performing the link restart on the link disable bit in the link control register of the first abnormal port again, if the first bandwidth information is still less than the preset bandwidth threshold corresponding to the second bandwidth information after performing a preset quantity of times of link restarts, the restart operation is performed on the base input/output system. By performing the restart operation on the base input/output system, the whole link is restarted, thereby realizing the automatic repair of the PCIe device.

In another situation, the link restart is performed based on the link disable bit in the link control register. Assuming that the PCIe device is repaired less than the preset quantity of times, and at this time, the base input/output system can be continued to start. In one embodiment, if the quantity of restart times of the link restart is less than or equal to a preset quantity of times and the first transmission rate is consistent with the second transmission rate after performing the quantity of restart times of link restarts, the base input/output system is continued to start. If the quantity of restart times of the link restart is less than or equal to a preset quantity of times and the first bandwidth information is equal to the preset bandwidth threshold corresponding to the second bandwidth information after performing the quantity of restart times of link restarts, the base input/output system is continued to start. By performing the link restart based on the link disable bit in the link control register, the state machine may be more stable and the startup time of the server is saved.

Figure 8:
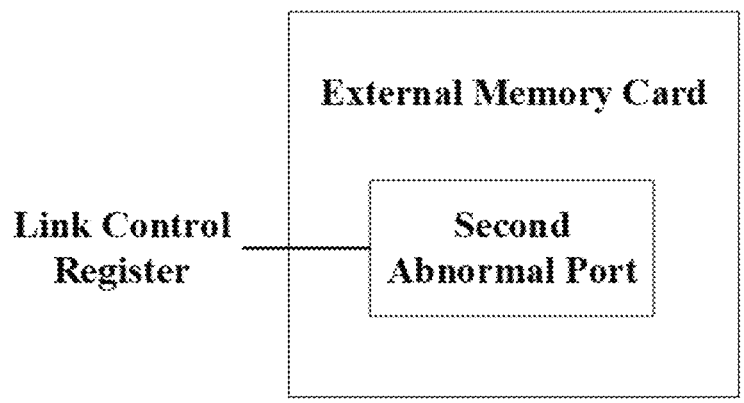
FIG. 8 is a structural block diagram of an external memory card provided in an embodiment of the present disclosure.

As an embodiment, the device in the embodiment of the present disclosure can also be an external memory card, and thus the external memory card can be automatically determined and repaired using the automatic repair method. Referring to FIG. 8, FIG. 8 is a structural block diagram of an external memory card provided in an embodiment of the present disclosure. In one embodiment, if it is detected that a communication connection is established with the external memory card, second link state information and second link performance information of a port corresponding to the external memory card are obtained, where the second link state information at least includes a third transmission rate of the port corresponding to the external memory card, and the second link performance information at least includes a fourth transmission rate of a link where the port corresponding to the external memory card is located; if the third transmission rate is inconsistent with the fourth transmission rate and the third transmission rate is less than a preset transmission rate, it is determined that the port corresponding to the external memory card is a second abnormal port; and a link restart is performed on a link disable bit in a link control register of the second abnormal port to complete a repair of the external memory card.

As an embodiment, if the third transmission rate is consistent with the fourth transmission rate, it is determined that an operating state of the external memory card is normal without performing a repair on the port corresponding to the external memory card, and the external memory card can be correctly identified. Therefore, in the case where the device is the external memory card, by comparing the transmission rate in the link state information and the transmission rate in the link performance information corresponding to the external memory card, the transmission rate may be used as the determination standard for the rate reduction to realize the automatic determination of the PCIe device, when the transmission rate in the link state information and the transmission rate in the link performance information are inconsistent, the automatic repair of the external memory card may be realized; and when the transmission rate in the link state information and the transmission rate in the link performance information are consistent, it is automatically determined that the PCIe device does not need to be repaired, and thus the determination process and the repair process may be automatically realized without manual investigation, the repair process is simplified, and the repair efficiency is improved.

Further, after performing the link restart on the link disable bit in the link control register of the second abnormal port, if the third transmission rate is still inconsistent with the fourth transmission rate after performing the link restart, the link restart is performed on the link disable bit in the link control register of the second abnormal port again. In one embodiment, performing the link restart on the link disable bit in the link control register of the second abnormal port again can include: setting the link disable bit in the link control register of the second abnormal port to 1 again, and then setting the link disable bit to 0 after a preset delay duration to complete a second link restart of the second abnormal port. Since the related processes of performing the link restart on the link disable bit in the link control register and the corresponding measures that the repair cannot be realized after performing the link restart for the preset quantity of times are described in detail in the previous embodiments, which will not repeat here.

Through the method for automatically repairing the device used in the embodiment of the present disclosure, not only device information may be identified by reading information such as a vendor identify (VID) and a device identify (DID), but also the automatic determination may be made according to the bandwidth and the rate of the PCIe device, and determination results may be used as determination indexes of resource allocation to allocate reserved resources and optimize the resource allocation mechanism, thereby greatly reducing the situation of insufficient resource reservation caused by the failure of reading and identifying the device.

In addition, the embodiments of the present disclosure take the server architecture as an illustrative example, but the methods provided by the embodiments of the present disclosure are not limited to servers or server systems, but are applicable to server systems or other computer systems of other platforms, and it can be understood that the present disclosure does not limited to this.

It should be noted that the embodiments of the present disclosure include but are not limited to the above examples, and it can be understood that under the guidance of the ideas of the embodiments of the present disclosure, a person skilled in the art can also make settings according to actual needs, and the present disclosure does not limit this.

In embodiments of the present disclosure, there is provided a method for automatically repairing a device. By obtaining link state information and link performance information of a port corresponding to a peripheral component interconnect express (PCIe) device; in response to a transmission rate in the link state information being inconsistent with a transmission rate in the link performance information, or in response to bandwidth information in the link state information being less than a preset bandwidth threshold corresponding to bandwidth information in the link performance information, determining that the port corresponding to the PCIe device is an abnormal port; and performing a link restart on a link disable bit in a link control register of the abnormal port to complete an automatic determination and repair of the PCIe device, the processing and repairing efficiency after reducing the rate and/or the bandwidth of the device is greatly improved, labor costs and repair costs are reduced, the accuracy of the resource reservation of the device is improved, and the strength of repairing the base input/output system is also increased.

In order to make a person skilled in the art better understand technical solutions of the embodiments of the present disclosure, the following will be explained and illustrated through an example.

Referring to FIG. 3, FIG. 3 is a flowchart of a method for automatically repairing a device provided in an embodiment of the present disclosure. In this example, a server is taken as the architecture, the automatic determination and repair for the PCIe device is taken as an example, and the repair strategy is to "set the link disable bit in the link control register of the abnormal port corresponding to the PCIe device to 1, wait for a delay duration of 100 ms, then set the link disable bit to 0, wait for the delay duration of 100 ms, and perform the link restart". The delay duration is set to 100 ms and the quantity of times of link restarts is set to three times, which is a reference implementation solution after repeated verification in the embodiment of the present disclosure. The solution may not only process of the situation of rate reduction and/or bandwidth reduction of the device without interfering with the normal operation of the codes, but also improve the repair probability to a greater extent. It can be understood that the present disclosure does not limit this.

In one embodiment, the process of determining and repairing the device involved in this example can mainly include the following steps:

S301, link state information and link performance information of a port corresponding to a peripheral component interconnect express (PCIe) device are obtained, where the link state information at least includes a first transmission rate and first bandwidth information of the port corresponding to the PCIe device, and the link performance information at least includes a second transmission rate and second bandwidth information of a link where the port corresponding to the PCIe device is located;

S302, it is determined whether the first transmission rate is consistent with the second transmission rate, and if the first transmission rate is consistent with the second transmission rate, a repair strategy is not performed; and if the first transmission rate is inconsistent with the second transmission rate, the repair strategy is performed;

S303, it is determined whether the first bandwidth information is less than a lowest bandwidth of uplink and downlink ports corresponding to the second bandwidth information, if the first bandwidth information is less than the lowest bandwidth, the repair strategy is performed; and if the first bandwidth information is not less than (that is, equal to) the lowest bandwidth, the repair strategy is performed;

S304, after performing the repair strategy, if the repair is still unsuccessful, the repair strategy is performed again;

S305, if the repair is successful by performing the repair strategy less than or equal to three times, a base input/output system is continued to start; and S306, if the repair is still unsuccessful by performing the repair strategy more than three times, the base input/output system is restarted.

It should be noted that for the sake of simple description, the method embodiments are all expressed as a series of action combinations. However, a person skilled in the art should know that these embodiments of the present disclosure are not limited by the order of the described actions, as certain steps can be performed in other orders or at the same time according to the embodiments of the present disclosure. Secondly, a person skilled in the art should also know that the embodiments described in the specification belong to some embodiments of the present disclosure, and the actions involved are not necessarily necessary for the embodiments of the present disclosure.

Referring to FIG. 4, FIG. 4 is a structural block diagram of an apparatus for automatically repairing a device provided in an embodiment of the present disclosure. The apparatus may include the following modules:

a device link information obtaining module 401 configured to obtain first link state information and first link performance information of a port corresponding to a peripheral component interconnect express (PCIe) device, where the first link state information at least includes a first transmission rate and first bandwidth information of the port corresponding to the PCIe device, and the first link performance information at least includes a second transmission rate and second bandwidth information of a link where the port corresponding to the PCIe device is located;

a first transmission rate comparison module 402 configured to in response to the first transmission rate being inconsistent with the second transmission rate, determine that the port corresponding to the PCIe device is a first abnormal port;

a first bandwidth information comparison module 403 configured to in response to the first bandwidth information being less than a preset bandwidth threshold corresponding to the second bandwidth information, determine that the port corresponding to the PCIe device is the first abnormal port; and a device link restart module 404 configured to perform a link restart on a link disable bit in a link control register of the first abnormal port to complete a repair of the PCIe device.

In one embodiment, the device link restart module 404 is configured to:
set the link disable bit in the link control register of the first abnormal port to 1, then set the link disable bit to 0, and perform the link restart on the first abnormal port.

In one embodiment, the device link restart module 404 is configured to:
set the link disable bit in the link control register of the first abnormal port to 1, then set the link disable bit to 0 after a preset delay duration, and perform the link restart on the first abnormal port.

In one embodiment, the first bandwidth information comparison module 403 is configured to:
in response to the first bandwidth information being less than a lowest bandwidth of uplink and downlink ports corresponding to the second bandwidth information, determine that a bandwidth corresponding to the first link state information is inconsistent with a bandwidth corresponding to the first link performance information, and determine the port corresponding to the PCIe device as the first abnormal port.

In one embodiment, the apparatus further includes:
a first bandwidth information comparison submodule configured to in response to the first bandwidth information being equal to the preset bandwidth threshold corresponding to the second bandwidth information, determine that an operating state of the PCIe device is normal without performing a repair on the port corresponding to the PCIe device.

In one embodiment, the first bandwidth information comparison submodule is configured to:
in response to the first bandwidth information being equal to the lowest bandwidth of uplink and downlink ports corresponding to the second bandwidth information, determine that the bandwidth corresponding to the first link state information is consistent with the bandwidth corresponding to the first link performance information, and determine that the operating state of the PCIe device is normal.

In one embodiment, the apparatus further includes:
a device link secondary restart module configured to in response to the first transmission rate being still inconsistent with the second transmission rate after performing the link restart, or in response to the first bandwidth information being still less than the preset bandwidth threshold corresponding to the second bandwidth information after performing the link restart, perform the link restart on the link disable bit in the link control register of the first abnormal port again.

In one embodiment, the device link secondary restart module is configured to:
set the link disable bit in the link control register of the first abnormal port to 1 again, and then set the link disable bit to 0 after a preset delay duration to complete a second link restart of the first abnormal port.

In one embodiment, the apparatus further includes:
a base input/output system restart module configured to in response to the first transmission rate being still inconsistent with the second transmission rate after performing a preset quantity of times of link restarts, perform a restart operation on a base input/output system.

In one embodiment, the apparatus further includes:
a base input/output system restart submodule configured to in response to the first bandwidth information being still less than the preset bandwidth threshold corresponding to the second bandwidth information after performing a preset quantity of times of link restarts, perform a restart operation on a base input/output system.

In one embodiment, the apparatus further includes:
a base input/output system start module configured to in response to a quantity of restart times of the link restart being less than or equal to a preset quantity of times and the first transmission rate being consistent with the second transmission rate after performing the quantity of restart times of link restarts, continue to start a base input/output system.

In one embodiment, the apparatus further includes:
a base input/output system start submodule configured to in response to a quantity of restart times of the link restart being less than or equal to a preset quantity of times and the first bandwidth information being equal to the preset bandwidth threshold corresponding to the second bandwidth information after performing the quantity of restart times of link restarts, continue to start a base input/output system.

In one embodiment, the apparatus further includes:
a first transmission rate comparison submodule configured to in response to the first transmission rate being consistent with the second transmission rate, determine that an operating state of the PCIe device is normal without performing a repair on the port corresponding to the PCIe device.

In one embodiment, the apparatus further includes:
an external memory card link information obtaining module configured to in response to detecting that a communication connection is established with an external memory card, obtain second link state information and second link performance information of a port corresponding to the external memory card, where the second link state information at least includes a third transmission rate of the port corresponding to the external memory card, and the second link performance information at least includes a fourth transmission rate of a link where the port corresponding to the external memory card is located;
a third transmission rate comparison module configured to in response to the third transmission rate being inconsistent with the fourth transmission rate and the third transmission rate being less than a preset transmission rate, determine that the port corresponding to the external memory card is a second abnormal port; and
an external memory card link restart module configured to perform a link restart on a link disable bit in a link control register of the second abnormal port to complete a repair of the external memory card.

In one embodiment, the apparatus further includes:
a third transmission rate comparison submodule configured to in response to the third transmission rate being consistent with the fourth transmission rate, determine that an operating state of the external memory card is normal without performing a repair on the port corresponding to the external memory card.

In one embodiment, the apparatus further includes:
an external memory card link secondary restart module configured to in response to the third transmission rate being still inconsistent with the fourth transmission rate after performing the link restart, perform the link restart on the link disable bit in the link control register of the second abnormal port again.

In one embodiment, the external memory card link secondary restart module is configured to:
set the link disable bit in the link control register of the second abnormal port to 1 again, and then set the link disable bit to 0 after a preset delay duration to complete a second link restart of the second abnormal port.

The apparatus embodiments are substantially similar to the method embodiments, and thus the description is relatively simple, and the relevant points can be found in part of the description of the method embodiments.

In addition, the embodiment of the present disclosure further provides an electronic device, including: a processor, a memory and a computer program stored in the memory and executable on the processor, where the computer program, when executed by the processor, implements the processes of the method for automatically repairing the device in the foregoing embodiments, and can achieve the same technical effects. To avoid repetition, details are not described herein again.

Figure 5:
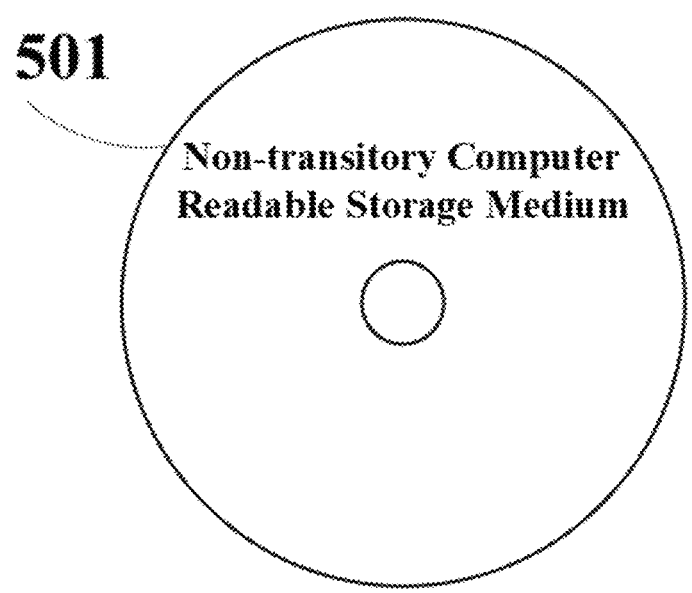
FIG. 5 is a schematic diagram of a non-transitory computer readable storage medium provided in an embodiment of the present disclosure.

As shown in FIG. 5, the embodiment of the present disclosure further provides a non-transitory computer readable storage medium 501 storing a computer program, where the computer program, when executed by a processor, implements the processes of the method for automatically repairing the device in the foregoing embodiments, and can achieve the same technical effects. To avoid repetition, details are not described herein again. For example, the non-transitory computer readable storage medium 501 includes a read-only memory (ROM), a random access memory (RAM), a magnetic disk, an optical disc, or the like.

Figure 6:
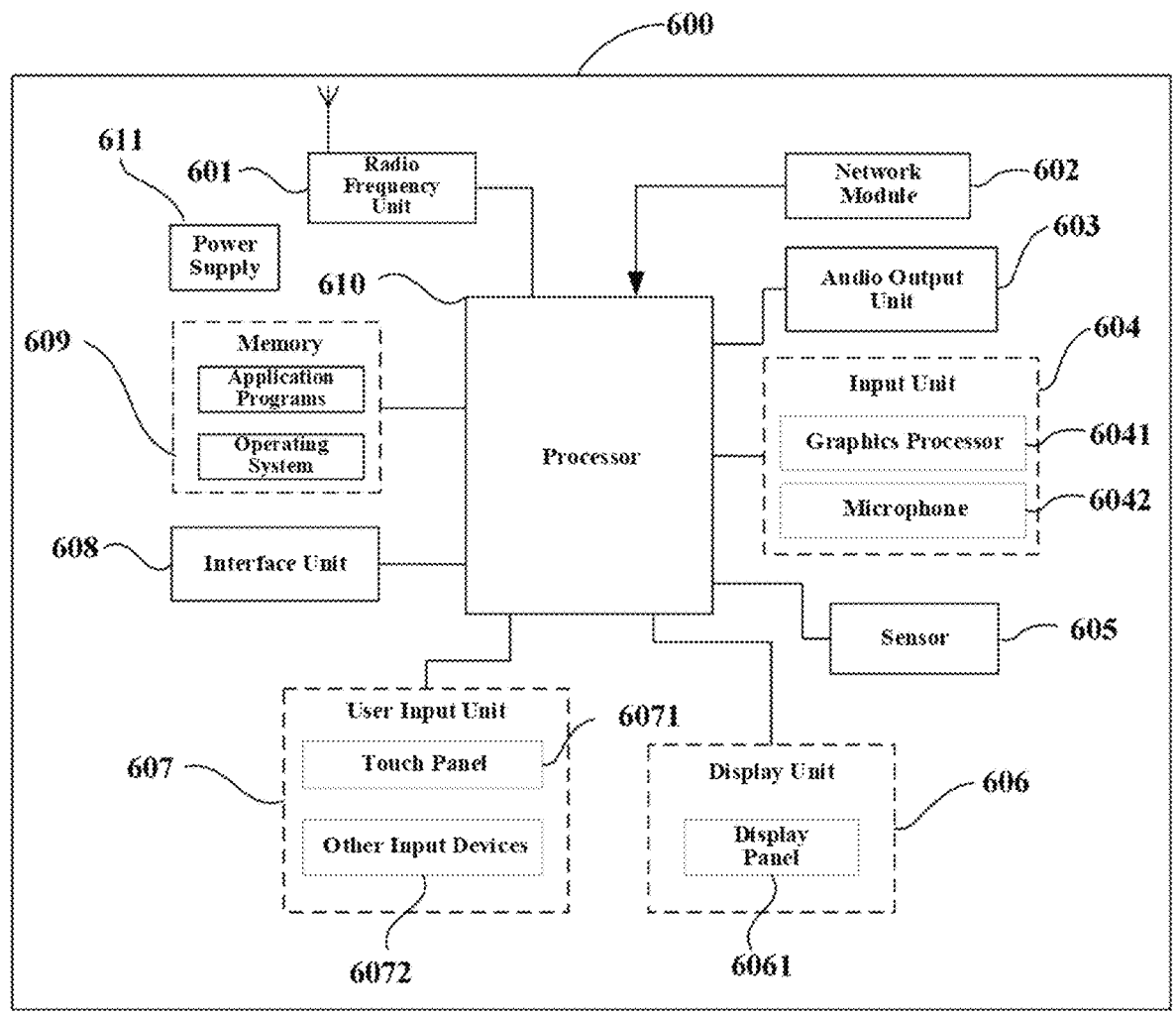
FIG. 6 is a block diagram of an electronic device provided in an embodiment of the present disclosure.

FIG. 6 is a schematic diagram of a hardware structure of an electronic device for implementing various embodiments of the present disclosure.

The electronic device 600 includes but is not limited to a radio frequency unit 601, a network module 602, an audio output unit 603, an input unit 604, a sensor 605, a display unit 606, a user input unit 607, an interface unit 608, a memory 609, a processor 610 and a power supply 611. It can be understood by a person skilled in the art that the structure of the electronic device involved in the embodiment of the present disclosure does not constitute a limitation on the electronic device, and the electronic device can include more or less components than shown in the drawings, or combine some components, or arrange different components. In the embodiments of the present disclosure, the electronic device includes but is not limited to a mobile phone, a tablet computer, a notebook computer, a palmtop computer, a vehicle-mounted terminal, a wearable device, a pedometer, or the like.

It should be understood that in the embodiment of the present disclosure, the radio frequency unit 601 may be configured to receive and transmit information, or to receive and transmit a signal in a call process, and specially, after receiving downlink data from a base station, transmit the downlink data to the processor 610 for processing; and also transmit uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may also communicate with a network and other devices via a wireless communications system.

The electronic device provides wireless broadband Internet access for a user by using the network module 602, for example, helping the user send and receive e-mails, browse web pages, and access streaming media.

The audio output unit 603 may convert audio data received by the radio frequency unit 601 or the network module 602 or stored in the memory 609 into an audio signal and output the audio signal as a sound. In addition, the audio output unit 603 may further provide audio output (for example, a call signal received sound or a message received sound) related to a specific function performed by the electronic device 600. The audio output unit 603 includes a speaker, a buzzer, a telephone receiver, and the like.

The input unit 604 is configured to receive audio or video signals. The input unit 604 may include a graphics processing unit (GPU) 6041 and a microphone 6042. The graphics processing unit 6041 processes image data of a static picture or a video obtained by an image capture apparatus (for example, a camera) in a video capture mode or an image capture mode. A processed image frame may be displayed on the display unit 606. The image frame processed by the graphics processing unit 6041 may be stored in the memory 609 (or another storage medium) or transmitted via the radio frequency unit 601 or the network module 602. The microphone 6042 is capable of receiving sounds and processing such sounds into audio data. The processed audio data can be converted, in a telephone call mode, into a format that can be transmitted via the radio frequency unit 601 to a mobile communication base station.

The electronic device 600 further includes at least one sensor 605, for example, an optical sensor, a motion sensor, and other sensors. In some embodiments, the optical sensor includes an ambient light sensor and a proximity sensor. The ambient light sensor may adjust brightness of a display panel 6061 based on intensity of ambient light, and the proximity sensor may turn off the display panel 6061 and/or backlight when the electronic device 600 moves close to an ear. As a type of motion sensor, an accelerometer sensor can detect magnitudes of accelerations in all directions (usually three axes), can detect a magnitude and a direction of gravity when in a static state, and can be applied to posture recognition (for example, screen switching between portrait and landscape, related games, and magnetometer posture calibration) of the electronic device, functions related to vibration recognition (for example, a pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided to the user. The display unit 606 may include the display panel 6061. The display panel 6061 may be configured in a form of a liquid crystal display (LCD), an organic light-emitting diode (OLED), or the like.

The user input unit 607 may be configured to: receive input digit or character information and generate key signal input related to user settings and function control of the electronic device. In some embodiments, the user input unit 607 includes a touch panel 6071 and other input devices 6072. The touch panel 6071 is also referred to as a touchscreen, and may collect a touch operation of the user on or near the touch panel (for example, an operation performed on or near the touch panel 6071 by the user by using any appropriate object or accessory such as a finger or a stylus). The touch panel 6071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, transmits the touchpoint coordinates to the processor 610, and can receive a command transmitted by the processor 610 and execute the command. In addition, the touch panel 6071 may be implemented in a plurality of forms, for example, as a resistive, a capacitive, an infrared, or a surface acoustic wave touch panel. The user input unit 607 may further include other input devices 6072 in addition to the touch panel 6071. In some embodiments, the other input devices 6072 may include but are not limited to a physical keyboard, a function button (for example, a volume button or a power on/off button), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides a corresponding visual output on the display panel 6061 based on the type of the touch event. It can be understood that in one embodiment, the touch panel 6071 and the display panel 6061 serve as two separate components to implement input and output functions of the electronic device. However, in some embodiments, the touch panel 6071 and the display panel 6061 may be integrated to implement the input and output functions of the electronic device, and this is not limited herein.

The interface unit 608 is an interface for connecting an external apparatus to the electronic device 600. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 608 may be configured to receive an input (for example, data information or power) from an external apparatus and transmit the received input to one or more elements in the electronic device 600, or may be configured to transmit data between the electronic device 600 and the external apparatus.

The memory 609 may be configured to store software programs and various data. The memory 609 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 609 may include a high-speed random access memory, or may further include a non-volatile memory, for example, at least one magnetic disk storage device, flash memory, or other volatile solid-state storage devices.

The processor 610 is a control center of the electronic device, uses various interfaces and lines to connect all parts of the entire electronic device, and performs various functions and data processing of the electronic device by running or executing the software program and/or module stored in the memory 609 and invoking data stored in the memory 609, thereby performing overall monitoring on the electronic device. The processor 610 may include one or more processing units. In some embodiments of the present disclosure, the processor 610 may integrate an application processor and a modem processor. The application processor mainly processes the operating system, a user interface, an application program, and the like. The modem processor mainly processes wireless communication. In some embodiments, it can be understood that the modem processor may be not integrated in the processor 610.

The electronic device 600 may further include a power supply 611 (for example, a battery) supplying power to the components. In some embodiments of the present disclosure, the power supply 611 may be logically connected to the processor 610 through a power management system, so that functions such as charge management, discharge management, and power consumption management are implemented by using the power management system.

In addition, the electronic device 600 includes some functional modules that are not shown. Details are not described herein.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of the present disclosure is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions of the foregoing embodiments, a person skilled in the art can clearly understand that the method in the foregoing embodiments may be implemented by software in combination with a necessary general hardware platform. In some embodiments, the method in the foregoing embodiments may be implemented by hardware. However, in many situations, the former is an example implementation. Based on such an understanding, the technical solutions of the present disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The foregoing describes the embodiments of the present disclosure with reference to the accompanying drawings. However, the present disclosure is not limited to the foregoing specific embodiments. The foregoing specific embodiments are merely illustrative rather than restrictive. As instructed by the present disclosure, a person of ordinary skill in the art may develop many other manners without departing from principles of the present disclosure and the protection scope of the claims, and all such manners fall within the protection scope of the present disclosure.

A person of ordinary skill in the art may be aware that the various exemplary units and algorithm steps described in conjunction with the embodiments disclosed in the embodiments of the present disclosure can be implemented by electronic hardware, or a combination of computer software and electronic hardware. Whether the functions are executed by hardware or software depends on particular applications and design constraint conditions of the technical solutions. A person skilled in the art can use different methods to implement the described functions for every particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present disclosure, it should be understood that the disclosed apparatus and method may be implemented in other manners. For example, the described apparatus embodiment is merely an example. For example, division into the units is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one position, or may be distributed on a plurality of network units. Some or all of the units may be selected based on actual requirements to achieve the objectives of the solutions of embodiments.

In addition, functional units in embodiments of the present disclosure may be integrated into one unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a computer software product. The computer software product is stored in a storage medium, and includes several instructions for instructing a computer device (which may be a personal computer, a server, a network device, or the like) to perform all or some of the steps of the method described in embodiments of the present disclosure. The storage medium may include but is not limited to any medium that can store program code, for example, a USB flash disk, a removable hard disk, a ROM, a RAM, a magnetic disk, or an optical disc.

In addition, the embodiments of the present disclosure may involve usage of user data. In practical applications, particular personal data of a user may be used in the solutions described herein to the extent permitted by applicable laws and regulations of the country involved, provided that the requirements of the applicable laws and regulations are met (for example, the user has given an explicit consent, the user has been duly notified, and the like).

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for automatically repairing a device, comprising:
   obtaining first link state information and first link performance information of a port corresponding to a peripheral component interconnect express (PCIe) device, wherein the first link state information at least comprises a first transmission rate and first bandwidth information of the port corresponding to the PCIe device, and the first link performance information at least comprises a second transmission rate and second bandwidth information of a link where the port corresponding to the PCIe device is located;
   in response to the first transmission rate being inconsistent with the second transmission rate, determining that the port corresponding to the PCIe device is a first abnormal port;
   in response to the first bandwidth information being less than a preset bandwidth threshold corresponding to the second bandwidth information, determining that the port corresponding to the PCIe device is the first abnormal port; and
   performing a link restart on a link disable bit in a link control register of the first abnormal port to complete a repair of the PCIe device,
   wherein, in response to the first bandwidth information being less than the preset bandwidth threshold corresponding to the second bandwidth information, determining that the port corresponding to the PCIe device is the first abnormal port comprises:
   in response to the first bandwidth information being less than a lowest bandwidth of uplink and downlink ports corresponding to the second bandwidth information, determining that a bandwidth corresponding to the first link state information is inconsistent with a bandwidth corresponding to the first link performance information, and determining the port corresponding to the PCIe device as the first abnormal port,
   wherein the method further comprises:
   in response to detecting that a communication connection is established with an external memory card, obtaining second link state information and second link performance information of a port corresponding to the external memory card, wherein the second link state information at least comprises a third transmission rate of the port corresponding to the external memory card, and the second link performance information at least comprises a fourth transmission rate of a link where the port corresponding to the external memory card is located;
   in response to the third transmission rate being inconsistent with the fourth transmission rate and the third transmission rate being less than a preset transmission rate, determining that the port corresponding to the external memory card is a second abnormal port; and
   performing a link restart on a link disable bit in a link control register of the second abnormal port to complete a repair of the external memory card.

2. The method according to claim 1, wherein performing the link restart on the link disable bit in the link control register of the first abnormal port comprises:

setting the link disable bit in the link control register of the first abnormal port to 1, then setting the link disable bit to 0, and performing the link restart on the first abnormal port.

3. The method according to claim 2, wherein setting the link disable bit in the link control register of the first abnormal port to 1, then setting the link disable bit to 0, and performing the link restart on the first abnormal port comprises:
setting the link disable bit in the link control register of the first abnormal port to 1, then setting the link disable bit to 0 after a preset delay duration, and performing the link restart on the first abnormal port.

4. The method according to claim 1, further comprising:
in response to the first bandwidth information being equal to the preset bandwidth threshold corresponding to the second bandwidth information, determining that an operating state of the PCIe device is normal without performing a repair on the port corresponding to the PCIe device.

5. The method according to claim 4, wherein, in response to the first bandwidth information being equal to the preset bandwidth threshold corresponding to the second bandwidth information, determining that the operating state of the PCIe device is normal comprises:
in response to the first bandwidth information being equal to the lowest bandwidth of uplink and downlink ports corresponding to the second bandwidth information, determining that the bandwidth corresponding to the first link state information is consistent with the bandwidth corresponding to the first link performance information, and determining that the operating state of the PCIe device is normal.

6. The method according to claim 1, wherein after performing the link restart on the link disable bit in the link control register of the first abnormal port, the method further comprises:
in response to the first transmission rate being still inconsistent with the second transmission rate after performing the link restart, or in response to the first bandwidth information being still less than the preset bandwidth threshold corresponding to the second bandwidth information after performing the link restart, performing the link restart on the link disable bit in the link control register of the first abnormal port again.

7. The method according to claim 6, wherein performing the link restart on the link disable bit in the link control register of the first abnormal port again comprises:
setting the link disable bit in the link control register of the first abnormal port to 1 again, and then setting the link disable bit to 0 after a preset delay duration to complete a second link restart of the first abnormal port.

8. The method according to claim 6, wherein after performing the link restart on the link disable bit in the link control register of the first abnormal port again, the method further comprises:
in response to the first transmission rate being still inconsistent with the second transmission rate after performing a preset quantity of times of link restarts, performing a restart operation on a base input/output system.

9. The method according to claim 6, wherein after performing the link restart on the link disable bit in the link control register of the first abnormal port again, the method further comprises:
in response to the first bandwidth information being still less than the preset bandwidth threshold corresponding to the second bandwidth information after performing a preset quantity of times of link restarts, performing a restart operation on a base input/output system.

10. The method according to claim 6, further comprising:
in response to a quantity of restart times of the link restart being less than or equal to a preset quantity of times and the first transmission rate being consistent with the second transmission rate after performing the quantity of restart times of link restarts, continuing to start a base input/output system.

11. The method according to claim 6, further comprising:
in response to a quantity of restart times of the link restart being less than or equal to a preset quantity of times and the first bandwidth information being equal to the preset bandwidth threshold corresponding to the second bandwidth information after performing the quantity of restart times of link restarts, continuing to start a base input/output system.

12. The method according to claim 1, further comprising:
in response to the first transmission rate being consistent with the second transmission rate, determining that an operating state of the PCIe device is normal without performing a repair on the port corresponding to the PCIe device.

13. The method according to claim 1, further comprising:
in response to the third transmission rate being consistent with the fourth transmission rate, determining that an operating state of the external memory card is normal without performing a repair on the port corresponding to the external memory card.

14. The method according to 1, wherein after performing the link restart on the link disable bit in the link control register of the second abnormal port, the method further comprises:
in response to the third transmission rate being still inconsistent with the fourth transmission rate after performing the link restart, performing the link restart on the link disable bit in the link control register of the second abnormal port again.

15. The method according to claim 14, wherein performing the link restart on the link disable bit in the link control register of the second abnormal port again comprises:
setting the link disable bit in the link control register of the second abnormal port to 1 again, and then setting the link disable bit to 0 after a preset delay duration to complete a second link restart of the second abnormal port.

* * * * *